G. W. BETTS.
Land-Markers.

No. 141,913.  Patented August 19, 1873.

Witnesses:  Inventor:

UNITED STATES PATENT OFFICE.

GEORGE W. BETTS, OF SHADEVILLE, OHIO.

IMPROVEMENT IN LAND-MARKERS.

Specification forming part of Letters Patent No. 141,913, dated August 19, 1873; application filed June 7, 1873.

*To all whom it may concern:*

Figure 1:
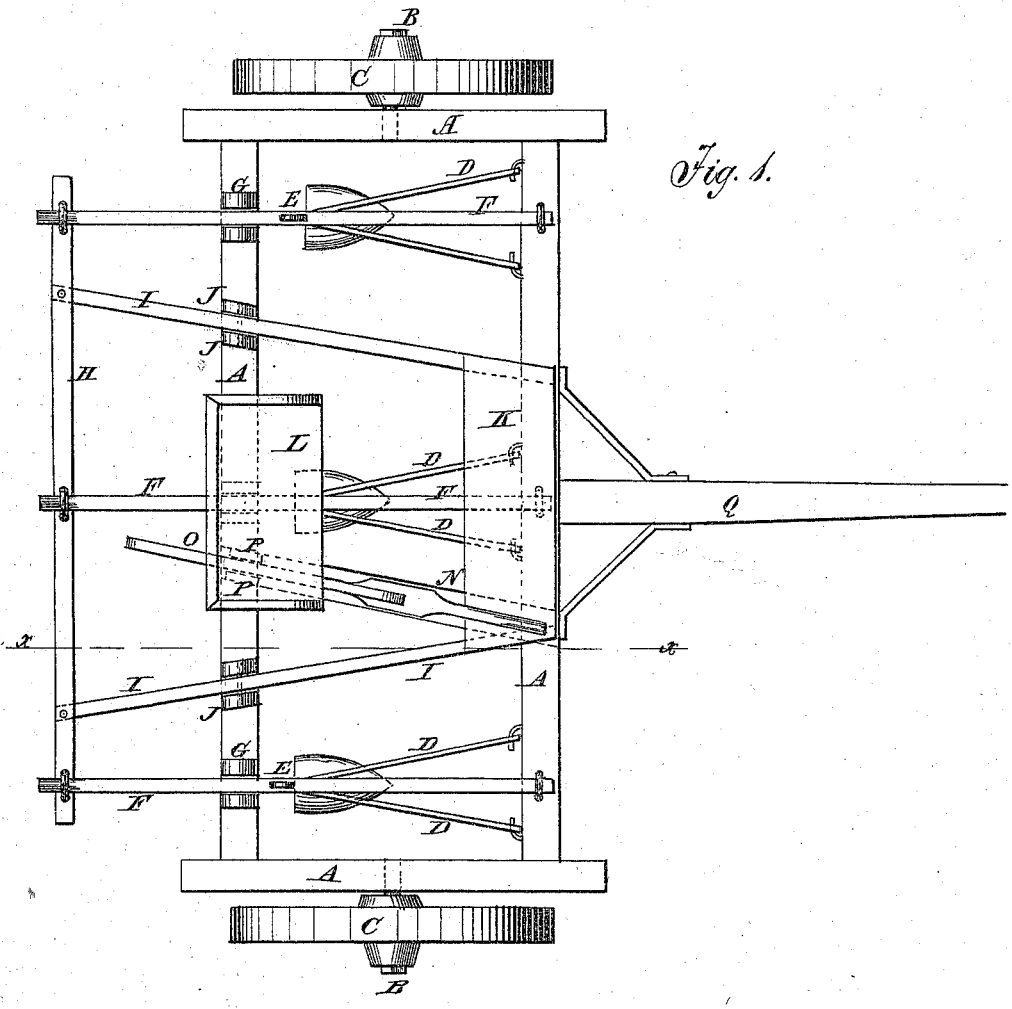
Figure 2:
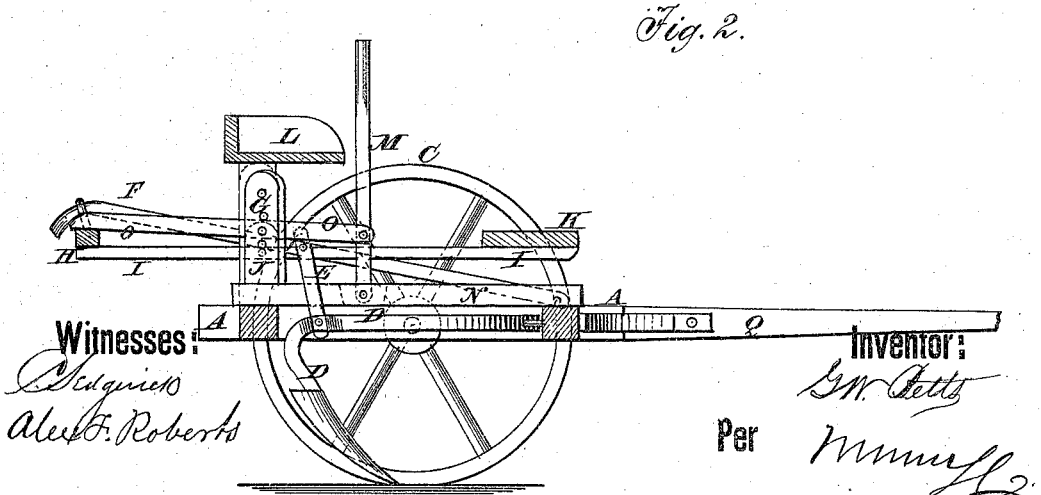

Be it known that I, GEORGE W. BETTS, of Shadeville, in the county of Franklin and State of Ohio, have invented a new and useful Improvement in Corn-Marker, of which the following is a specification:

Figure 1 is a top view of my improved machine. Fig. 2 is a vertical section of the same taken through the line $x\ x$, Fig. 1.

Similar letters of reference indicate corresponding parts.

My invention relates to an arrangement of a sliding bar and pivoted lever with the pivoted frame to which the markers are connected, as hereinafter described.

A is the frame, consisting of four bars connected with each other at the ends. To the middle parts of the side bars of the frame A are attached the short axles B, upon which the wheels C revolve. D are the plow-beams, three or more of which are used. The forward ends of the beams D are made forked, and are pivoted to the front bar of the frame A, so that the plows or markers may have a free vertical, but no lateral movement. To the plow-beams D are attached the lower ends of the bars E, the upper ends of which are pivoted to the levers F. The forward ends of the levers F are pivoted to the upper side of the front bar of the frame A. The rear parts of the levers F pass through the guide-slots of the uprights G, the lower ends of which are secured to the rear bar of the frame A. In the uprights G are formed several holes, to receive pins to limit the downward movement of the levers F, and consequently the depth at which the plows work in the ground. The rear ends of the levers F pass through keepers attached to the bar H, so that the plows or markers may all be raised and lowered at the same time, by raising and lowering the said bar H. The bar H is attached to the rear ends of two levers, I, which are pivoted to short studs J, attached to the rear bar of the frame A. The forward ends of the levers I are connected by a board, K, for the driver to rest his feet upon, so that the driver, while sitting upon the seat L, can with his feet raise the plows from the ground, to pass an obstruction, or for convenience in turning around. M is a hand-lever, the lower end of which is pivoted to a cross-bar, N, attached to the front and rear bars of the frame A. To the lever M is pivoted the forward end of a bar, O, which slides in the slot of the upright P, attached to the rear bar of the frame A, or to the bar N. The bar O projects rearwardly, so that, by adjusting it by means of the lever M, it can be thrust under the bar H, and thus made to support the plows when raised from the ground; or, what is its more important function, it can be adjusted above the bar H, and thus caused to act as a lever for forcing the plows farther into the ground. The slotted upright P has several holes formed through it to receive pins, between which the bar O slides, so that by adjusting the said pins the bar O may be adjusted to support the plows at any desired distance from the ground. Q is the tongue, which is attached to the middle part of the front bar of the frame A, and is strongly braced, as shown in Figs. 1 and 2.

Having thus described my invention, I claim as new and desire to secure by Letters Patent—

The combination, with the lever-frame F F H, the treadle I K, and plow-beams D, connected with the former by bars E, of the sliding bar O, working between uprights P, and the vertical pivoted lever M, as shown and described.

GEORGE W. BETTS.

Witnesses:
　WASHINGTON E. EVANS,
　GEORGE EAST.